United States Patent [19]

Dons et al.

[11] Patent Number: 4,766,587
[45] Date of Patent: Aug. 23, 1988

[54] ELECTRICAL APPARATUS SUCH AS A DISC-RECORD PLAYER, COMPRISING A MOUNTING DEVICE FOR A DRIVE MOTOR

[75] Inventors: Franciscus A. Dons, Hasselt; Hermanus F. Einhaus, Ham, both of Belgium

[73] Assignee: U.S. Philips Corporation, New York, N.Y.

[21] Appl. No.: 18,212

[22] Filed: Feb. 24, 1987

[30] Foreign Application Priority Data

Feb. 24, 1986 [NL] Netherlands .......................... 8600451

[51] Int. Cl.$^4$ ............................................. G11B 25/04
[52] U.S. Cl. ..................................... 369/263; 248/573; 248/603; 248/638; 369/63
[58] Field of Search ................. 369/263, 258, 63, 266, 369/267, 264; 248/638, 603, 604, 573

[56] References Cited

U.S. PATENT DOCUMENTS

| | | | |
|---|---|---|---|
| 2,070,018 | 2/1937 | Mecklenburger | 248/603 |
| 2,576,271 | 11/1951 | Yerzley | 248/573 |
| 4,396,807 | 8/1983 | Brewer | 248/604 |
| 4,553,231 | 11/1985 | d'Alayer | 369/263 |

FOREIGN PATENT DOCUMENTS 986835 3/1965 United Kingdom ................ 248/573

Primary Examiner—Steven L. Stephan
Attorney, Agent, or Firm—David R. Treacy

[57] ABSTRACT

An electrical apparatus such as a disc-record player, comprises a mounting device for a drive motor (7). The motor housing (6) is resiliently suspended on fixed motor supports (4) in the housing (1) of the apparatus so as to be in a radial direction with respect to the motor axis (7a). For this purpose suspension rings (11) of an elastic and vibration-dampening material are fitted around mounting elements (10) on the motor housing (6) and around the motor supports (4). The motor housing (6) carries stop portions (13) which in the event of axial movement of the motor housing (6) abut against fixed abutment surfaces (14) inside the housing (1) to limit said movement. Positioning means (15,20) are provided, which position said stop portions (13) and abutment surfaces (14) in such a way relative to each other after turning of the motor housing (6) and stretching of the suspension rings (11) that the stop portions (13) can move freely along the abutment surfaces (14) in an axial direction.

8 Claims, 5 Drawing Sheets

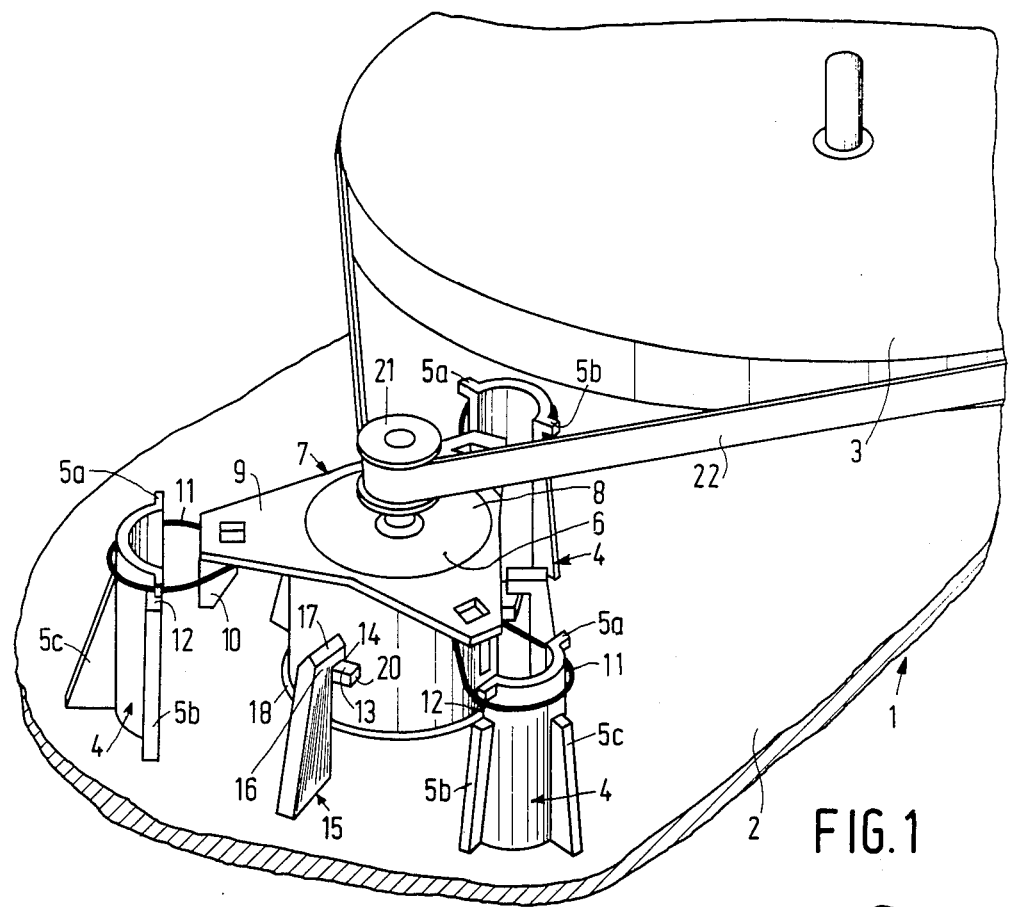
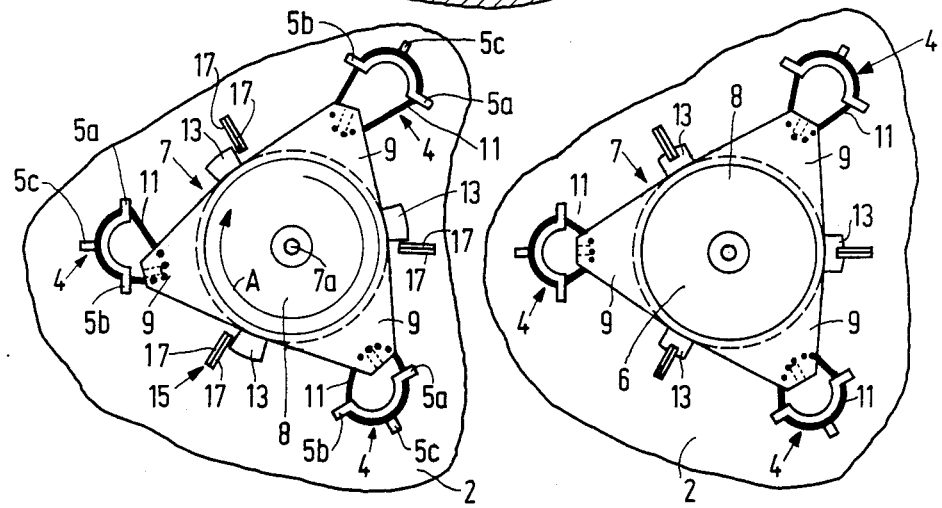

ELECTRICAL APPARATUS SUCH AS A DISC-RECORD PLAYER, COMPRISING A MOUNTING DEVICE FOR A DRIVE MOTOR

The invention relates to an electrical apparatus, such as a disc-record player, comprising a mounting device for a drive motor and a housing, the motor having a housing which is resiliently suspended on motor supports so as to be movable in a radial direction with respect to the motor axis, for which purpose suspension rings of an elastic and vibration-damping material are arranged around mounting elements on the motor housing and around the motor supports which supports occupy fixed positions inside the housing of the apparatus, stop portions are arranged on the motor housing which in the event of axial movement of the motor housing abut against fixed abutment surfaces inside the housing of the apparatus to limit said axial movement.

In many electrical apparatuses such as disc-record players it is desirable to mount the drive motor in the housing of the apparatus in such a way that motor vibrations are damped effectively and cannot become annoying.

A mounting device known from document GB-A-1025820 comprises suspension rings which are arranged between the motor housing and the housing of the apparatus and which have a stiffness such that pivotal movements of the motor housing are counteracted effectively.

In the known mounting device the stop portions limit movements of the motor housing as a result of shocks or other impact forces. This may happen, for example, during transport. However, those stop portions require special attention during mounting of the motor housing inside the housing of the apparatus.

It is the object of the invention to provide an apparatus with a mounting device of the type defined in the opening paragraph in which mounting can be performed simply and rapidly and in which after mounting the mounting device is protected against overloading of the suspension elements.

To this end the invention is characterized in that positioning means are provided which position said stop portions and abutment surfaces in such a way relative to each other after turning of the motor housing about the motor axis and stretching of the suspension rings that the stop portions can move freely along the abutment surfaces in an axial direction. Since during mounting of the motor housing inside the housing of the apparatus the positioning means ensures that the stop portions can move freely along the abutment surfaces in an axial direction, the motor housing can be secured easily and rapidly to the motor supports during assembly after turning the motor housing and simultaneously stretching the suspension rings.

A preferred embodiment of the invention is characterized in that the motor housing extends at least partly into an opening in a wall of the housing of the apparatus and at least an axial end wall of the motor housing is accessible from the exterior of the housing of the apparatus, the abutment surfaces limiting a movement of the motor housing relative to said wall of the housing of the apparatus in an inward direction.

Since the motor housing extends into said opening the motor housing occupies a minimal height in an axial direction inside the housing of the apparatus. This enables the height of the apparatus, for example a disc-record player, to be reduced. The mounting device in accordance with the invention is also very advantageous if the motor is manually accessible from the exterior through the opening because the abutment surfaces prevent the motor housing from being displaced too far when it is touched, so that the suspension rings and/or the connecting wires of the motor cannot be damaged.

Another embodiment of the invention is characterized in that the stop portions are situated on projections which extend in radial directions with respect to the motor axis and which also comprise control surfaces which form part of the positioning means, which control surfaces, after said turning of the motor housing, are guided on guide srufaces which occupy fixed positions in the housing and which form part of the positioning means, to position the stop portions relative to the abutment surfaces. Combining the projections with the control surfaces facilitates the positioning of the stop portions and the abutment surfaces relative to each other so that mounting of the motor housing is easy because the control surfaces are guided along the guide surfaces after said turning of the motor housing.

A further preferred embodiment of the invention is characterized in that the positioning elements comprise first guide surfaces which extend substantially parallel to the motor axis and second guide surfaces which are inclined at an acute angle to the motor axis and which guide the control surfaces towards the first guide surfaces when the motor housing is moved in the axial direction, thereby causing the motor housing to be turned. As the second guide surfaces are inclined at an acute angle relative to the motor axis the control surfaces are guided smoothly towards the first guide surfaces when the motor housing is mounted, so that assembly can be carried out easily and rapidly with minimal attentiveness.

Yet another embodiment of the invention is characterized in that the positioning elements also constitute the motor supports and the projections on the motor housing also constitute the mounting elements. This reduces the number of parts of the mounting device in accordance with the invention.

Embodiments of the invention will now be described in more detail, by way of example, with reference to the accompanying drawings. In the drawings:

FIG. 1 is a perspective view of parts of an electrical apparatus in the form of a disc-record player player with a mounting device in accordance with the invention, and FIG. 2a is a plan view of the mounting device shown in FIG. 1 during mounting of the drive motor;

FIG. 2b is a plan view similar to FIG. 2a after mounting of the drive motor;

Figure 3:
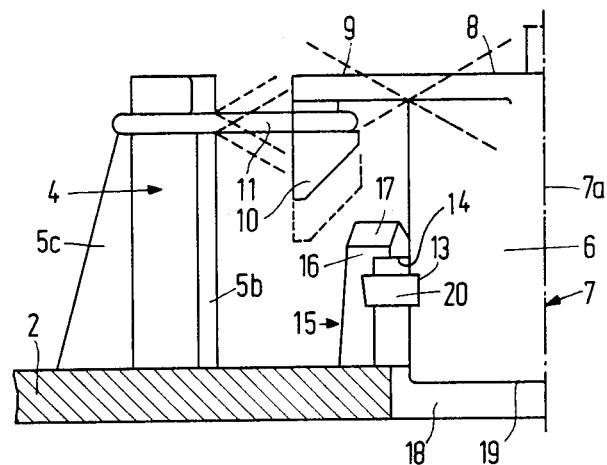
FIG. 3 is a side view of a part of the mounting device and the drive motor of FIG. 1 shown to a different scale.

FIG. 1 shows a part of an electrical apparatus which may be, for example, a disc-record player. The apparatus comprises a housing 1 having a wall 2 on which a turntable 3 is rotatably supported. The disc-record player is of a generally used type, known per se. An example of such a disc-record player is described in the Applicants' Netherlands Patent Application No. 83.04334 which has been laid open to public inspection (PHN 10.889) and therefore further parts of the disc-record player are not shown. The wall 2 forms a bottom wall of the housing 1. Three motor supports 4 are arranged on the upper side of the wall and are manufactured integrally with the wall 2 from a plastics by means of injection-moulding. As is shown in FIG. 1, there are three supports 4. These supports extend substantially perpendicularly to the wall 2 and each comprise three reinforcement ribs 5a, 5b and 5c.

As can be seen in FIG. 2, the supports 4 are regularly spaced around the housing 6 of a drive motor 7 and are of semicircular channel-section in plan view. To secure the motor 7 to the motor housing 6 three connecting members 9, which are suitable made of a plastics are arranged near the upper axial end wall 8 of the motor housing. Each connecting member extends from the motor housing in a radial direction to a point spaced radially from an associated one of the motor supports 4. A hook-like mounting element 10 is arranged on the underside of each connecting member 9 at the end thereof which is remote from the motor housing 6.

Rings 11 constituting suspension elements and made of an elastic vibration-damping material surround the motor supports 4, which rings serve for mounting the motor 7 and, by a suitable choice of the material, effectively prevent vibrations produced by the motor 7 from being transmitted to the turntable 3. The rings 11 may be made of, for example, an elastomer, and their dimensions are such that prior to the mounting of the motor they remain held on the semicircular motor supports 4. In this respect it is important that each motor support 4 is formed with recesses 12 in the two outer ribs 5a, 5b, to receive the respective ring 11 whilst the centre rib 5c extends from the wall 2 to a point level with, or below the level of, the recesses 12. Thus, each suspension ring can be easily fitted onto the respective motor support 4 before the mounting element 10 is hooked in as described hereinafter.

The circumferential wall of the motor housing 6 carries three projections 13 which, as is shown in FIG. 2b, are also spaced equidistantly around the circumference of the motor housing, whilst each projection 13 being arranged substantially equidistantly from two adjacent motor supports 4. In the mounted position each projection engages beneath an abutment surface 14 on an associated positioning element 15, which is also made integrally with the wall 2 from a plastics. The positioning elements 15 are of strip-like form and extend upwardly from the wall 2, and its upper end each positioning element has a portion which extends radially with respect to the motor axis 7a, as viewed in the plan view of FIG. 2b. The upright major walls of each positioning element 15 form first guide surfaces 16 whose function will be described hereinafter. At the top each positioning element 15 comprises a limb which extends towards the motor housing 6 and which comprises the abutment surface 14 at its underside. The upper side of the limb comprises two adjoining inclined second guide surfaces 17 which converge at an acute angle in the upward direction, the two surfaces being inclined at angles of substantially 45° relative to the upper side of the wall 2. In the assembled condition the motor housing 6 extends at least partly into an opening 18 in the wall 2. In this position the lower axial end wall 19 of the motor housing, which wall is located inside the opening 18, is accessible from the exterior. The advantage of such a construction is that the mounting height occupied by the motor housing inside the housing of the apparatus is comparatively small. As in practice the height of the motor housing 6 largely determines the overall height of the apparatus housing, this enables the overall height of the apparatus housing to be reduced. Therefore, it is very advantageous that the motor housing 6 extends below the upper side of the wall 2 (see FIG. 3).

Before the motor is mounted the electrical connecting wires are connected to the motor. This wiring is not shown. Before the drive motor 7 is fitted into the mounting device in accordance with the invention the suspension rings 11 are fitted around the motor supports 4. This may be effected simply and rapidly because, due to dimensions of the rings relative to the these of the motor supports and to the presence of the recesses 12, the rings retain their positions on the supports once they have been fitted. Subsequently the electric motor 7 is hooked into the rings 11 by means of the mounting elements 10. To mount the motor in the mounting device the motor is tilted in a manner as shown schematically in FIG. 3, and the mounting element 10 on the left-hand connecting member 9 as viewed in FIG. 2a is hooked into the adjacent ring 11. In order to enable the projections 13 to engage beneath the abutment surfaces 14 of the positioning elements 15 the motor is subsequently turned in a direction opposite to that indicated by the arrow A in FIG. 2a. Turning can be effected easily by sliding the projections 13 down the inclined second guide surfaces 17 of the positioning elements and simultaneously pressing the motor downwards. During the downward movement the side walls 20 of the projections 13 slide along the first guide surfaces 16 of the positioning elements, so that after the motor housing has been turned about the axis 7a and the ring 11 has been stretched the projections are readily movable in an axially downward direction along the projecting limbs of the positioning elements 15. In the turned position the motor housing 6 and with it the mounting element 10 on the top-right connecting member 9, as viewed in FIG. 2a, are moved towards the adjacent motor support 4 and the mounting element 10 is inserted into the adjacent ring 11. This is followed by a similar movement of the motor housing towards the bottom-right motor support 4 and the mounting element 10 at this location is inserted into the third mounting ring 11. When this has been done and the projections 13 have all been engaged beneath the abutment surfaces 14 the motor 7 is turned back in the direction indicated by the arrow A under the influence of the elasticity of the rings 11. The final position of the motor housing 6 is the position shown in FIG. 2b. After the mounting of the drive motor in the mounting device a drive belt 22 is engaged around a motor pulley 21 at the upper side of the housing 6 and then turned around the circumference of the turntable 3. The turntable can now be driven by the motor 7.

If, for example during transport, the housing 6 is subjected to shocks, an excessive axial movement of the motor housing 6 is prevented effectively. An upward or downward axial movement is limited by abutment of the projections 13, serving as stop portions, against the abutment surfaces 14 and against the wall 2 respectively. This limitation is also advantageous because in the present embodiment the wall 2 is open underneath the motor 7 and the motor 7 might be pressed inwards inadvertently when touched. Such an inward movement is always limited by the abutment of the stop portions 13 against the abutment surfaces 14. This prevent the mounting elements 10 from becoming detached from the rings 11 and the mounting device and/or the electrical wiring from being damaged, whilst it also ensures that the drive belt cannot become detached from the drive pulley 21 and/or the turntable as a result of an excessive displacement of the drive motor. In order to release the motor housing from the mounting device the motor housing must again be turned about the axis 7a to allow the stop portions 13 to be moved past the abutment surfaces 14. It is to be noted that in the mounted condition there is suitably a small clearance between the stop portions 13 and the abutment surfaces 14 in order to enable tensile forces in the drive belt 22 to be compensated for. Such tensile forces may result in the motor housing being tilted slightly. However, excessive tilting is prevented by abutment of the projections 13 against the abutment surfaces 14. It is also important that the mounting device in accordance with the invention simplifies mounting. During mounting of the drive motor the mounting elements 10 can be inserted simply and rapidly into the rings 11, whilst for the movement past the abutment surfaces 14 no special attention is needed because when the motor 7 is pressed downwards the motor housing is turned automatically as a result of the inclined second guide surface 17. This enables the projections 13 readily to engage beneath the abutment surfaces 14. The suspension rings 11 used enable the desired damping of motor vibrations to be adapted simply to specific vibration properties of the apparatus, particularly of the relevant motor 7. This is of special importance when the mounting device is used in apparatuses such as disc-record players, which are generally equipped with different motors and housings.

Figure 4:
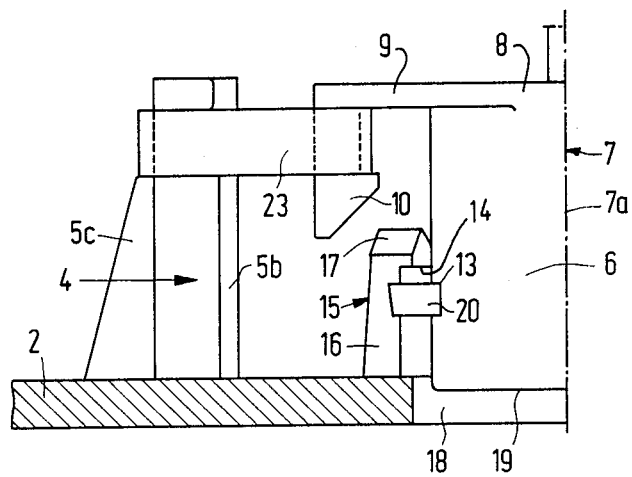
FIG. 4 is a side view similar to FIG. 3, showing the mounting device adapted for use in conjunction with a differentially dimensioned suspension ring.

FIG. 4 shows how the mounting device of FIGS. 1 to 3, by means of simple modifications, can readily be adapted to use suspension rings 23 of greater depth measured parallel to the motor axis 7a. Corresponding parts bear the same reference numerals. FIG. 4 clearly illustrates that the mounting device in accordance with the invention can use suspension rings of different dimensions.

Figure 5:
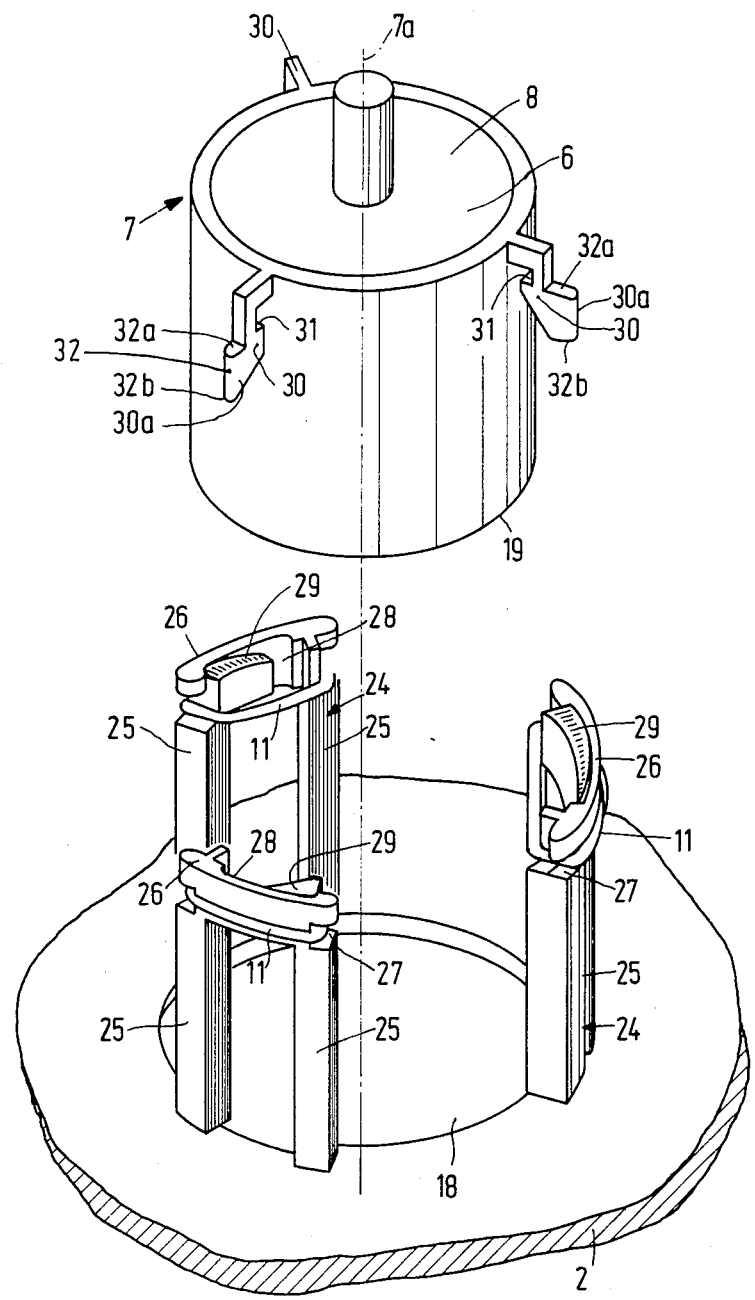
FIG. 5 is an exploded perspective view to a different scale, showing apart of an electrical apparatus with a mounting device and the associated drive motor in a second embodiment.

FIG. 5 shows another embodiment of the invention, the main difference between this and the preceding embodiment being that the positioning elements also constitute the motor supports and the projections on the motor housing also constitute the mounting elements. For this purpose three positioning elements 24 are arranged on the wall 2. These elements each comprise two upright limbs 25 which extend parallel to each other and which are interconnected at the top by a bridge portion 26. This bridge portion is formed with recesses 27 in which the suspension rings 11 are fitted. Thus, in this embodiment, also the suspension rings can readily be fitted in advance. Each bridge-portion has a first guide surface 28 which extends parallel to the motor axis 7a. Adjoining the first guide surface 28 is an inclined second guide surface 29 formed on the bridge portion 26, which surface 29 extends at an acute angle to the guide surface 28. As is shown in FIG. 5, the guide surface 29 extends from the left-hand side of the bridge portion 26 as viewed from the axis 7a towards the guide surface 28 in a downward direction relative to the upper side of the wall 2. The motor housing 6 carries hook-like mounting elements constituted by projections 20 which have a dual function. At the side facing the housing 6 the projections 30 are formed with recesses 31 which are adapted to receive the rings 11. Further, at the outer sides the projections 30 carry stop portions 32a and 32b whose functions are similar to those of the stop portions formed by the projections 13 in the preceding embodiments and which in the event of a movement in an axial direction abut against the abutment surfaces on the lower sides of the bridge portions 26 of the positioning elements 24 or against the wall 2. Mounting the drive motor 7 is effected in a manner similar to that in the first embodiment. One of the projections 30 is hooked into one of the rings 11, the stop portion 32b of the projection sliding down the inclined second guide surface 29 of the positioning element on which that ring is fitted and subsequently a control surface 30a on the projection 30 sliding down the first guide surface 28 of the positioning element. The motor then occupies the turned position in the same way as described with reference to FIG. 2a. Subsequently, the motor is hooked behing the other two rings 11. The advantage of this construction is that the projections 30 are brought to their engaged positions while of the motor housing is being turned, which proceeds very smoothly as a result of the inclined second guide surfaces 29. When the motor has been mounted, its lower axial end wall 19 is again located in the opening 18. As a result of the integration of a number of parts this construction of the mounting device in accordance with the invention comprises a smaller number of separate parts.

Figure 6:
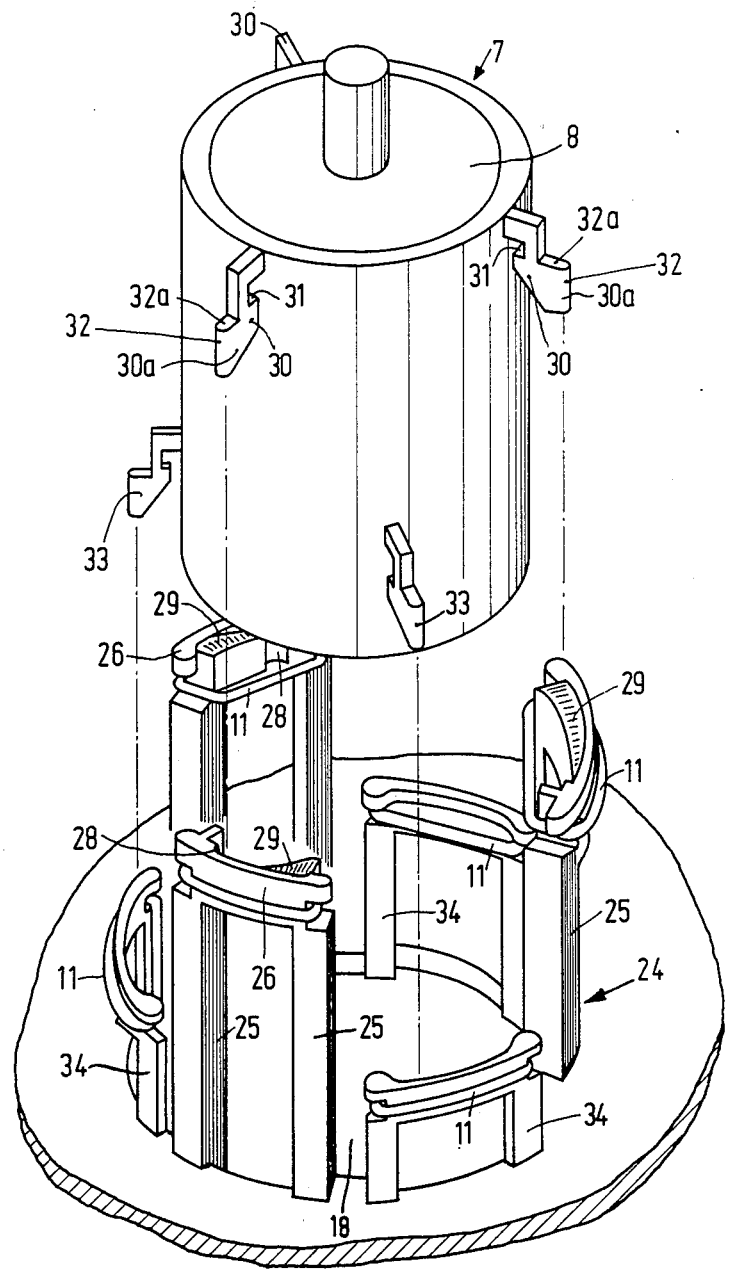
FIG. 6 is an exploded view showing a part of an electrical apparatus with a mounting device and the associated drive motor in a third embodiment.

FIG. 6, which shows an alternative embodiment, illustrates that it is also possible to employ the mounting device in accordance with the invention in conjunction with a motor housing of a comparatively large axial height. For this purpose the motor housing is provided with two series of mounting elements, the first mounting elements 32 being situated at the top and the second mounting elements 33 near the bottom of the motor housing. The mounting elements of the first series are offset from those of the second series circumferentially of the motor housing. Elastic suspension rings 11 connect the first mounting elements 32 to positioning elements 24 identical to the positioning elements 24 in FIG. 5. The second mounting elements 33 are connected to further motor supports 34 which are also provided with elastic suspension rings 11. In this way a stable mounting by means of the mounting device in accordance with the invention can also be obtained in the case of a motor of comparatively large height. In principle, the motor is mounted with the same procedure as in the preceding embodiments.

Figure 7:
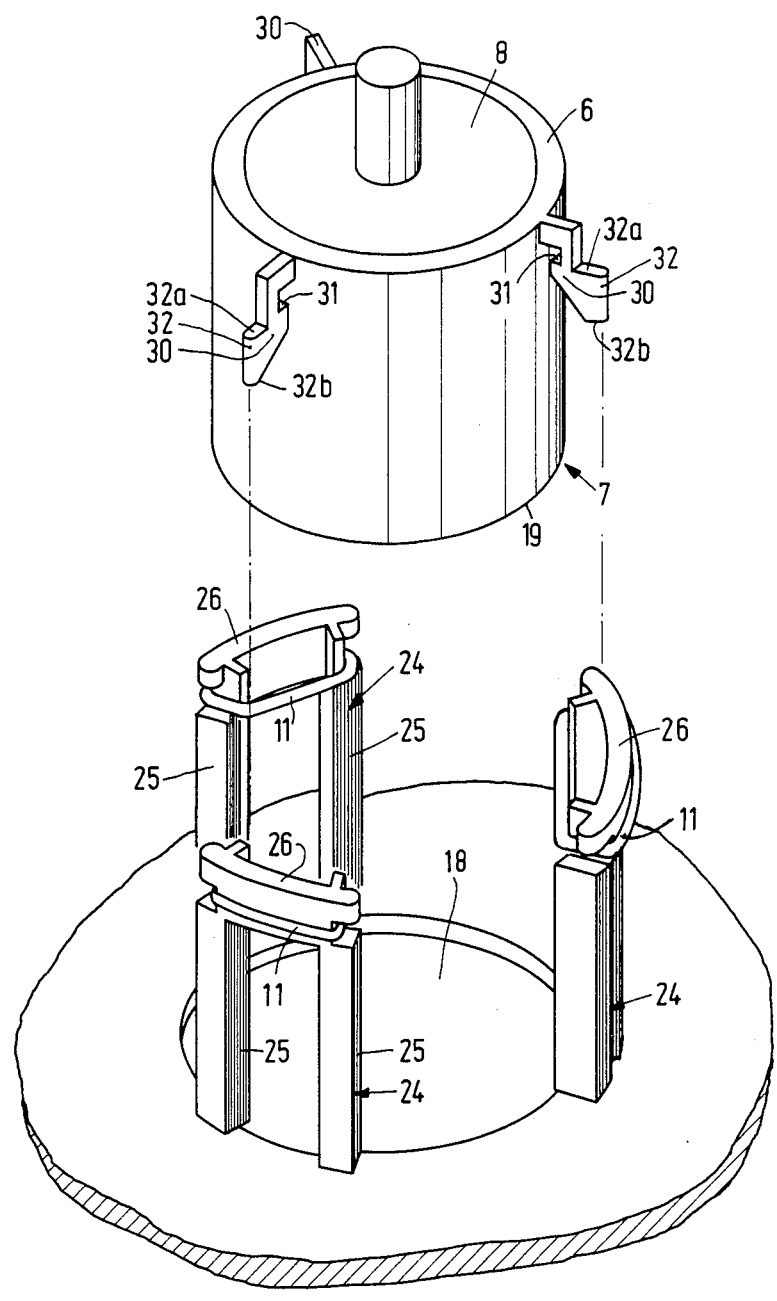
FIG. 7 is an exploded perspective view showing a part of an electrical apparatus with a mounting device and the associated drive motor in a fourth embodiment.

FIG. 7 shows that in an alternative embodiment the motor housing 6 can also be mounted without being turned. In this embodiment the bridge portion 26 of each positioning element 24 is not formed with the guide surfaces 28 and 29. Mounting is effected merely by tilting the motor housing. This embodiment also provides protection against excessive axial movements of the motor housing 6, but it does not provide the additional protection afforded in the preceding embodiment in which the motor housing must be turned to mount the motor.

What is claimed is:

1. An electrical apparatus, such as a disc-record player, comprising a mounting device for a drive motor (7) and a housing, the motor (7) having a housing (6) which is resiliently suspended on motor supports (4) so as to be movable in a radial direction with respect to the motor axis (7a) for which purpose suspension rings (11) of an elastic and vibration-damping material are arranged around mounting elements (10) on the motor housing (6) and around the motor supports (4) which supports (4) occupy fixed positions inside the housing of the apparatus;

stop portions (13) are arranged on the motor housing (6) which in the event of axial movement of the motor housing (6) abut against fixed abutment surfaces (14) inside the housing (1) of the apparatus to limit said axial movement, characterized in that positioning means (15,20) are provided which position said stop portions (13) and abutment surfaces (14) in such a way relative to each other after turning of the motor housing (6) about the motor axis and stretching of the suspension rings (11) that the stop portions (13) can move freely along the abutment surfaces (14) in an axial direction.

2. An apparatus as claimed in claim 1, characterized in that the motor housing (6) extends at least partly into an opening (18) in a wall (2) of the housing (1) of the apparatus and at least an axial end wall (19) of the motor housing (6) is accessible from the exterior of the housing (1) of the apparatus, the abutment surfaces (14) limiting a movement of the motor housing (6) relative to said wall (19) of the housing (11) of the apparatus in an inward direction.

3. An apparatus as claimed in claim 1 or 2, characterized in that the stop portions are situated on projections (13) which extend in radial directions with respect to the motor axis (7a) and which also comprise control surfaces (20) which form part of the positioning means, which control surface (20) after said turning of the motor housing (6), are guided on guide surfaces (17) which occupy fixed positions inside the housing (1) and which form part of the positioning means to position the stop portions (13) relative to the abutment surfaces (14).

4. An apparatus as claimed in claim 3, characterized in that positioning elements (15) which are connected to said wall (2) of the housing (1) of the apparatus and which are each provided with guide surfaces (17) and abutment surfaces (14) are arranged inside the housing (1) of the apparatus.

5. An apparatus as claimed in claim 4, characterized in that the positioning elements (15) comprise first guide surfaces (16) which extend substantially parallel to the motor axis and second guide surfaces (17) which are inclined at an acute angle to the motor axis and which guide the control surfaces (20) towards the first guide surfaces (16) when the motor housing (6) is moved in the axial direction, thereby causing the motor housing (6) to be turned.

6. An apparatus as claimed in claim 5, characterized in that each positioning element (15) comprises two adjoining second guide surfaces (17) which enclose an acute angle, and two first guide surfaces (16).

7. An apparatus as claimed in claim 4, characterized in that the positioning elements (24) also constitute the motor supports and the projections (30) on the motor housing (6) also constitute the mounting elements.

8. An apparatus as claimed in claim 7, characterized in that the motor housing (6) carries first and second mounting elements (32,33), which are situated near a first and a second axial end wall (8,19) respectively of the motor housing (6) and which are each secured to a motor support (24,34) by means of suspension rings (11).

* * * * *